United States Patent
Dautz et al.

(10) Patent No.: US 11,790,715 B2
(45) Date of Patent: Oct. 17, 2023

(54) AUTHENTICATING ON AUTOMATED SHIPMENT MACHINES

(71) Applicants: Christoph Dautz, Bonn (DE); Florian Markert, Bonn (DE); Markus von Gostomski, Bonn (DE)

(72) Inventors: Christoph Dautz, Bonn (DE); Florian Markert, Bonn (DE); Markus von Gostomski, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/357,629

(22) Filed: Mar. 19, 2019

(65) Prior Publication Data

US 2019/0287326 A1 Sep. 19, 2019
US 2020/0226860 A9 Jul. 16, 2020

(30) Foreign Application Priority Data

Mar. 19, 2018 (DE) ...................... 10 2018 106 352.0

(51) Int. Cl.
| | |
|---|---|
| G06K 5/00 | (2006.01) |
| G07C 9/28 | (2020.01) |
| G06Q 10/0832 | (2023.01) |
| G06Q 10/0835 | (2023.01) |
| G06Q 10/0836 | (2023.01) |
| G07C 9/00 | (2020.01) |

(52) U.S. Cl.
CPC ........... *G07C 9/28* (2020.01); *G06Q 10/0832* (2013.01); *G06Q 10/0835* (2013.01); *G06Q 10/0836* (2013.01); *G07C 2009/0092* (2013.01)

(58) Field of Classification Search
CPC ....... G06K 19/00; G06F 16/381; G06Q 10/08
USPC ........................ 235/382, 380, 462.46, 272.02
See application file for complete search history.

(56) References Cited

U.S. PATENT DOCUMENTS

| | | | |
|---|---|---|---|
| 9,648,579 B2 * | 5/2017 | Abhishek | H04B 1/3822 |
| 9,659,421 B2 * | 5/2017 | Boles | G07C 9/38 |
| 10,026,054 B1 * | 7/2018 | Staton | B65D 25/00 |
| 10,062,047 B2 * | 8/2018 | Kadaba | B65G 1/137 |
| 10,345,818 B2 * | 7/2019 | Sibley | G06Q 10/08355 |
| 10,401,851 B2 * | 9/2019 | Carlhoff | B60W 30/00 |

(Continued)

FOREIGN PATENT DOCUMENTS

| | | |
|---|---|---|
| CN | 106296891 A | 1/2017 |
| CN | 106882154 A | 6/2017 |

(Continued)

OTHER PUBLICATIONS

Jack Erjavec et al., "Automotive Technology: A Systems Approach," 6th Edition, Feb. 21, 2014, 24 pages, Delmar Cengage Learning.

(Continued)

*Primary Examiner* — Daniel St Cyr
(74) *Attorney, Agent, or Firm* — Reinhart Boerner Van Deuren P.C.

(57) ABSTRACT

A method for loading and/or unloading an automated shipment machine with shipments by means of a user with a vehicle or for preparing same. In the method, the user on the vehicle is authenticated. The vehicle is taken into communication range for communication with the automated shipment machine. The vehicle is authenticated on the automated shipment machine, and optionally, the user is authenticated on the automated shipment machine.

15 Claims, 4 Drawing Sheets

(56) References Cited

U.S. PATENT DOCUMENTS

| | | | |
|---|---|---|---|
| 10,930,101 B2* | 2/2021 | Whytock | G07F 19/202 |
| 11,398,122 B2* | 7/2022 | Terp | G07F 17/0014 |
| 2008/0203146 A1* | 8/2008 | Betancourt | G06Q 30/02 |
| | | | 235/375 |
| 2013/0206279 A1 | 8/2013 | Ryan | |
| 2014/0045147 A1* | 2/2014 | Mohn | H04L 67/12 |
| | | | 434/69 |
| 2015/0321595 A1 | 11/2015 | Hempsch et al. | |
| 2017/0011571 A1 | 1/2017 | Boles et al. | |
| 2017/0024687 A1 | 1/2017 | Wiechers | |
| 2017/0024688 A1 | 1/2017 | Wiechers | |
| 2017/0039510 A1 | 2/2017 | Ogilvie et al. | |
| 2017/0220996 A1* | 8/2017 | High | G07C 9/33 |
| 2017/0323545 A1 | 11/2017 | Gillen et al. | |
| 2019/0138990 A1* | 5/2019 | Alezzani | G06Q 10/10 |
| 2019/0266819 A1* | 8/2019 | McHale | G05D 23/1917 |
| 2019/0342702 A1* | 11/2019 | Shinar | H04W 4/40 |

FOREIGN PATENT DOCUMENTS

| | | |
|---|---|---|
| DE | 10 2014 105 241 A1 | 6/2015 |
| DE | 102015111748 A1 | 1/2017 |
| DE | 10 2016 209 380 A1 | 11/2017 |

OTHER PUBLICATIONS

Dobromir Todorov, "Mechanics of User Identification and Authentication," Jun. 18, 2007, 74 pages, Auerbach Publications, Taylor & Francis Group.
Wikipedia, "Authentication," Internet Article, Mar. 2, 2018, 12 pages.
Thilo Weichert, "Privacy in the car. The car as a big smartphone with wheels. Parts 1 and 2," Jun. 2014, The National Academies of Sciences Engineering Medicine, 5 pages (including translation).
Wikipedia, "Touch ID," Internet Article, last edited Jun. 13, 2019, 8 pages.
Wikipedia, "Two-factor authentication," Internet Article, last edited May 25, 2019, 2 pages.
Tara M. Swaminatha et al.: "Wireless Security and Privacy: Best Practices and Design Techniques", Aug. 1, 2002; Addison-Wesley, Preface, pp. 22-23.
Aaron E. Earle: "Wireless Security Handbook", Dec. 16, 2005; Auerbach Publications, p. 281.
China Automotive Logistics Development Report, Oct. 31, 2016, 4 pages, Chief editor of the Automotive Logistics Branch of China Federation of Logistics and Purchasing, China Fortune Publishing House.

\* cited by examiner

AUTHENTICATING ON AUTOMATED SHIPMENT MACHINES

CROSS-REFERENCE TO RELATED PATENT APPLICATION

This patent application claims priority to German Application No. 10 2018 106 352.0, filed Mar. 19, 2018, the entire teachings and disclosure of which are incorporated herein by reference thereto.

FIELD OF THE INVENTION

The present invention relates inter alia to methods and apparatuses used when loading and/or unloading an automated shipment machine or preparing same, in particular during the authentication on the automated shipment machine.

BACKGROUND TO THE INVENTION

Shipments, such as small-object shipments (for example parcels), addressed to particular people are normally handed over personally to people who are authorized for this, which can sometimes for example also be another person in the household or a neighbour, in order to ensure that the shipments do not get into unauthorized hands. However, there is the possibility of the addressee or a person authorized for acceptance not being found, which means that the handover cannot be effected and a further handover attempt needs to be made at the same or a different location. This increases the logistical outlay considerably and can lead to the addressee of the shipment or the person authorized for acceptance coming into possession of the shipment only rather late. If the addressee of the shipment or the person authorized to accept the shipment collects the shipment at a collection point, for example a branch of a company transporting the shipment, this is also often time-consuming and laborious. This applies in particular to a personal handover of the shipment, since in that case there is often also accumulated waiting time before the addressee of the shipment or the person authorized to accept same can accept the shipment.

For this reason, the shipments can be deposited in automated shipment machines, for example in packing stations, on request. These can have for example storage units, in particular lockers, and the shipments can be opened by the authorized person at a later or arbitrary time using an access card, a code or otherwise in order to take the shipment from the applicable storage unit. Automated shipment machines of this kind can equally be used for sending shipments by virtue of a customer depositing a shipment for sending in a storage unit or a locker of the automated shipment machine.

However, the automated shipment machines also need to be loaded with the shipment for delivery by the company transporting and delivering the shipment, and shipments deposited therein need to be taken from the automated shipment machine by the transport company.

The prior art discloses various methods for loading and/or unloading automated shipment machines into which shipments need to be loaded by a delivery agent or from which shipments need to be unloaded by a delivery agent, and for preparing this process, in different configurations.

As such, one possibility is that the delivery agent has an identification card and also knows a PIN (linked to the card). When the delivery agent then reaches an automated shipment machine, he first of all needs to insert his card on the automated shipment machine, or at least hold it in a reading area, so that said card or identification information can thereupon be electronically or optically detected. Subsequently, the delivery agent is asked to enter the PIN. Finally, the delivery agent can load shipments into the automated shipment machine or take them therefrom.

A disadvantage of the described method is firstly that it is comparatively time consuming and the delivery agent loses valuable time as a result of the two-step authentication process alone. It would admittedly be conceivable to reduce the authentication of the delivery agent just to use of the identification card or the PIN, for example. This would be detrimental to security, however.

Even with the two-step authentication process described, however, the method is still in need of improvement from a security point of view. For example, the identification card can easily be lost or left on the automated shipment machine by the delivery agent. This is critical in particular if the delivery agent should also note his PIN on the identification card or on a label on the card.

Increasing security would admittedly be conceivable by providing for further authentication steps for the delivery agent. This would then again take time, however, and would have a disadvantageous effect on the speed of the method.

The present invention is thus based on the object of making the process of loading and/or unloading an automated shipment machine, and preparing same, both as time-saving as possible and as secure as possible.

BRIEF SUMMARY OF A FEW EXEMPLARY EMBODIMENTS OF THE INVENTION

According to a first aspect, the description relates to a method for loading and/or unloading an automated shipment machine with shipments by means of a user with a vehicle or for preparing same, the method comprising:
  authenticating the user on the vehicle;
  taking the vehicle into communication range for communication with the automated shipment machine;
  authenticating the vehicle on the automated shipment machine; and
  optionally authenticating the user on the automated shipment machine.

According to the first aspect, the description also relates to an alternative method for loading and/or unloading an automated shipment machine with shipments by means of a user with a vehicle or for preparing same, at least performed by the automated shipment machine, the method comprising:
  authenticating the vehicle on the automated shipment machine when the vehicle is in communication range for communication with the automated shipment machine, wherein the authenticating of the vehicle on the automated shipment machine presupposes a preceding authenticating of the user on the vehicle; and
  optionally authenticating the user on the automated shipment machine.

An automated shipment machine is understood to mean for example a parcel station, an automated parcel machine and/or a parcel box. A parcel station is generally understood to mean a (at least partially automated) collection point and/or delivery point for parcel shipments, such as for example an automated parcel machine or a parcel box. An automated parcel machine is understood to mean for example a parcel station. A parcel box is understood to mean in particular a (private) house letterbox that the customer can use to receive and/or post small packets and/or parcels. The automated shipment machine can thus allow in particular receipt and/or posting of parcels and small packets for a customer.

The automated shipment machine can have for example one or more (in particular a multiplicity of) storage units (for example lockers). A storage unit can receive a shipment, for example. A storage unit can be opened during a process for example only by the user (delivery agent) and the respective recipient or sender.

A shipment is understood in the present case to mean preferably a small-object shipment. A small-object shipment is for example a book shipment, a small packet, a parcel or a goods shipment. Similarly, however, a shipment can also be a bulk goods shipment. Small-object shipments and bulk goods shipments do not normally fit into standard house letterboxes and thus regularly need to be delivered or collected for example by means of automated shipment machines, which have been described. Nevertheless, the shipment can likewise be a mail shipment, however, for example a letter or a postcard.

The user is in the present case is in particular a delivery agent, that is to say in particular an employee working for the transport company transporting the shipment. Even if the delivery agent does not just load shipments for delivery into the automated shipment machine, but rather also unloads shipments for sending from the automated shipment machine, the term delivery agent is always used in the present case. The user is in particular the driver or passenger of the vehicle at the same time.

The vehicle can likewise be designed for autonomous driving, or drive autonomously. In this case, the user can be present in the vehicle, but without having to drive the vehicle. Alternatively, however, it is likewise possible for the user not to be present, or a passenger, in the vehicle.

The automated shipment machine can additionally also be used by the customers, that is to say the people to whom the respective shipments are addressed (recipients), or who want to send a shipment (senders).

Loading of the automated shipment machine by means of the user (delivery agent) is required when a shipment that is supposed to be delivered to a recipient by means of the automated shipment machine is supposed to be deposited in the automated shipment machine. Unloading of the automated shipment machine by the user (delivery agent) is required when a shipment that is supposed to be sent by a sender by means of the automated shipment machine is supposed to be taken from the automated shipment machine.

The vehicle is in particular designed to be able to transport a multiplicity of applicable shipments (delivery agent's vehicle). By way of example, the vehicle is a goods vehicle, in particular a van. By way of example, the vehicle is a motor vehicle. By way of example, the vehicle is a partially or completely electrically driven vehicle (electric vehicle).

The authenticating of the user (delivery agent) on the vehicle can initially ensure that an authorized person uses the vehicle for the purpose of loading and/or unloading an automated shipment machine. By way of example, starting the vehicle without the authentication is not possible. By way of example, the authentication of the user on the vehicle is an action that is independent of the starting of the vehicle, and can be effected for example before or after starting. By way of example, an authentication, for example on a delivery round or in the course of a day, is typically necessary only once. By way of example, the user authenticates himself (once) at the beginning of his delivery round. The authenticating can in this case comprise an action by the user, the vehicle or both. As such, the authenticating can for example comprise the user having authentication information ready. The authenticating can for example comprise the vehicle receiving authentication information (from the user). By way of example, the authentication of the user on the vehicle associates the delivery agent and the vehicle with one another.

By way of example, the authenticating is effected by means of an item of the user that carries or stores applicable authentication information, knowledge of the user or a characteristic of the user. Examples of items of the user are a (physical) personalized ignition key or an ID card (for example an employee ID) of the user. In this case, the authenticating can be effected using a portable electronic apparatus, for example a radio frequency identification tag (RFID tag), in particular a near field communication tag (NFC tag), or else a card storing applicable authentication information, for example in a chip or a magnetic strip. Alternatively or additionally, it is possible for the authenticating to be effected using an optically readable code, for example a barcode, in particular a two-dimensional barcode, that can be read by the vehicle (or a device connected thereto or integrated therein). An example of knowledge of the user is a password, a PIN or an answer to a security question. The authenticating is then effected by the user for example using an input box or an interface of the vehicle. An example of a characteristic of the user on the basis of which the authentication can be effected is for example a biometric feature of the user, for example his fingerprint, his face, a behaviour, his voice or his iris.

In each case, the vehicle or an applicable apparatus that can be regarded as part of the vehicle can have applicable means in order to perform an applicable authentication.

When the vehicle has been taken into communication range for communication with the automated shipment machine, the vehicle and the automated shipment machine can receive reciprocally sent signals and in particular set up a communication connection. The communication between the vehicle and the automated shipment machine is effected in this case in particular based on a local radio technique, such as for example according to the radio frequency identification (RFID) technique, according to the near field communication (NFC) standard, according to the Bluetooth (Bluetooth LE) standard and/or according to a wireless local area network (WLAN), for example according to the IEEE-802.11 standard. To this end, the vehicle and the automated shipment machine can each have applicable communication interfaces for sending and/or receiving applicable signals. The vehicle is taken into communication range of the automated shipment machine typically as an applicable automated shipment machine is approached.

When the vehicle and the automated shipment machine are in communication range, authenticating of the vehicle on the automated shipment machine can be effected. In this case too, the authenticating can comprise an action by the vehicle, the automated shipment machine or both. As such, the authenticating can comprise for example the vehicle having authentication information ready. The authenticating can for example comprise the automated shipment machine receiving authentication information (from the vehicle).

The authentication results in or the authentication involves for example a secure, that is to say in particular encrypted, connection being set up between the vehicle and the automated shipment machine. By way of example, the authenticating comprises the (encrypted) transmitting of a nonce. By way of example, a challenge-response method is used, as will be described in more detail below.

The effect that can be achieved by the authentication of the vehicle on the automated shipment machine is that actions and steps on the automated shipment machine that need to be performed in particular by the user can be dispensed with, such as for example, the manual use, described at the outset, of an identification card by the user on the automated shipment machine. This results not only in an advantageous time saving, however, but also in effects relevant to security. This is because the risk of loss, as there is with an identification card that needs to be used at each automated shipment machine, does not exist with a vehicle. The problem of PINs recorded on the identification card, as described at the outset, can also advantageously be overcome.

Therefore, the vehicle can be regarded as a (hardware) token used for the authentication on the automated shipment machine. A particularly advantageous aspect in this case is that the vehicle used is not any hardware token. This is because the user has initially had to authenticate himself on the vehicle before an applicable authentication of the vehicle on the automated shipment machine is possible. The vehicle and the user can thus be regarded as a logical unit from which only the vehicle needs to authenticate itself on the automated shipment machine. In other words, the authenticating of the vehicle on the automated shipment machine in particular also authenticates the user indirectly or implicitly on the automated shipment machine on account of the fact that the user has initially authenticated himself on the vehicle.

The authenticating of the vehicle on the automated shipment machine can in this instance be one factor of a multifactor authentication (for example two-factor authentication).

Furthermore, an optional (explicit) authentication of the user on the automated shipment machine can be effected. The authentication of the user can be effected for example as already described in connection with the authentication of the user on the vehicle, to which reference is made here, that is to say in particular by means of an item, knowledge or a characteristic of the user. As likewise already described, the authenticating can in this instance comprise an action by the user, the automated shipment machine or both. As such, the authenticating can comprise for example the user having authentication information ready. The authenticating can comprise for example the automated shipment machine receiving authentication information (from the user). The authenticating of the user on the automated shipment machine can in this instance be one factor of a multifactor authentication (for example two-factor authentication).

The authentication of the user on the automated shipment machine can be dispensed with in particular if the vehicle is an autonomous vehicle and the user is not present in the vehicle.

Ultimately, it is thus possible to specify a method for loading and/or unloading an automated shipment machine, or for preparing same, that is faster and at the same time more secure in comparison with the prior art.

According to a second aspect, the description also relates to an apparatus configured for performing or comprising means for performing the method according to the first aspect. The apparatus can in this case be in particular the automated shipment machine or part thereof.

According to a third aspect, the description also relates to a system comprising:
an automated shipment machine and
a vehicle, wherein the system is configured for performing the method according to the first aspect or comprises corresponding means.

By way of example, an applicable apparatus (that is to say in particular the automated shipment machine and/or the vehicle) comprises at least one processor and at least one memory, wherein the memory stores a program comprising program instructions, wherein the memory and the program are configured to, using the processor, cause the apparatus at least to perform one or more of the exemplary methods according to the first aspect when the program is executed on the processor. A processor is intended to be understood to mean for example a control unit, a microprocessor, a micro-control unit such as a microcontroller, a digital signal processor (DSP), an application-specific integrated circuit (ASIC) or a field programmable gate array (FPGA).

For example, an exemplary apparatus further comprises means for storing information such as a program memory and/or a main memory. For example, an exemplary apparatus according to the invention further comprises respective means for receiving and/or sending information via a network, such as a network interface. For example, exemplary apparatuses according to the invention are connected and/or connectable to one another via one or more networks.

An exemplary apparatus is configured, for example in terms of software and/or in terms of hardware, to be able to perform individual or all steps of an exemplary method according to the first aspect.

According to a fourth aspect, the description also relates to a computer program product comprising program instructions in order to perform a method according to the first aspect when the program is executed on a processor.

An exemplary program according to the invention can be stored in or on a computer-readable storage medium that contains one or more exemplary programs and is e.g. in the form of a magnetic, electrical, electromagnetic, optical and/or other kind of storage medium. A computer-readable storage medium of this kind is preferably concrete (that is to say "tangible"), for example it is in the form of a data carrier apparatus. Such a data carrier apparatus is, by way of example, portable or permanently installed in an apparatus. Examples of such a data carrier apparatus are volatile or non-volatile random access memories (RAMs) such as e.g. NOR flash memories or sequential access memories such as NAND flash memories and/or read only memories (ROMs) or read/write memories. Computer-readable is intended to be understood, for example, to mean that the storage medium can be read and/or written to by a computer or a data processing installation, for example by a processor.

According to an exemplary configuration of the aspects, the authenticating of the user on the automated shipment machine is effected by means of an authentication method independent of the vehicle. This allows the security of the method to be increased further. This is because possession of the vehicle (on which the user has already authenticated himself, for example) is then for example not sufficient to obtain complete access to the automated shipment machine. As already explained, while the vehicle can be regarded as one factor of a multifactor authentication, the authenticating of the user on the automated shipment machine can be regarded in particular as a further (for example second) factor of a multifactor authentication method (for example of a two-factor authentication). As likewise already explained, the authentication method can be configured differently and for example comprise the entry of a PIN on the automated shipment machine by the user.

According to a further exemplary configuration of the aspects, authentication of the user on the vehicle involves receiving authentication information of the user on the vehicle; and/or authentication of the vehicle on the automated shipment machine involves receiving authentication information of the vehicle on the automated shipment machine; and/or authentication of the user on the automated shipment machine involves receiving authentication information of the user on the automated shipment machine.

Accordingly, authentication of the user on the vehicle can involve authentication information being provided from the user to the vehicle; and/or authentication of the vehicle on the automated shipment machine can involve authentication information being provided from the vehicle to the automated shipment machine; and/or authentication of the user on the automated shipment machine can involve authentication information being provided from the user to the automated shipment machine.

Authentication information can in this instance be dependent on the respective authentication method used. The respective authentication information can be authentication information suitable for the respective authentication method. Authentication information can comprise a password, a digital key and/or a digital certificate, for example.

In one example, at least some of the authentication information provided by the vehicle to the automated shipment machine and received by the latter is based on the authentication information of the user that is received on the vehicle. That is to say that the authentication information of the vehicle can be dependent on the authentication information of the user, for example can be generated on the basis thereof or can comprise it.

According to a further exemplary configuration of the aspects, the authenticating of the user on the vehicle, the authenticating of the vehicle on the automated shipment machine and/or the authenticating of the user on the automated shipment machine comprises a challenge-response method. In this respect, the respective authentication can be regarded as a challenge-response authentication. A challenge-response authentication is understood in this case to mean in particular a secure authentication method in which one side transmits an applicable challenge and the other side transmits a response and in so doing proves that it knows particular information, but in particular without transmitting this information itself. By way of example, the challenge-response method comprises the transmission of a nonce. By way of example, the challenge-response method is based on the use of a hash function.

According to a further exemplary configuration of the aspects, the authentication of the vehicle on the automated shipment machine is effected exclusively and/or automatically when the vehicle is in communication range of and/or closer than a prescribed physical distance to the automated shipment machine.

When the vehicle is in communication range of and/or closer than a prescribed physical distance to an automated shipment machine, this typically also applies the other way round, that is to say that the automated shipment machine is then in communication range of the vehicle and/or closer than a prescribed physical distance to the vehicle. An automated shipment machine is for example in communication range of the vehicle if an availability test from the vehicle to the automated shipment machine (and/or the other way round) is successful. An availability test is for example a ping request. If the availability test is successful, it can be assumed that a communication connection can be set up and in particular an authentication can be performed. A physical distance from the vehicle to the automated shipment machine can be ascertained for example by virtue of the current physical position of the vehicle being known (for example based on a satellite navigation system or from another source) and also the physical positions of the automated shipment machine being known and a comparison of these positions being made. Similarly, the physical distance can be ascertained by means of the round trip time or round trip delay from messages or data packets exchanged between the vehicle and the automated shipment machine. As such, the physical distance can also be ascertained using the availability test by virtue of the ping time or ping duration being measured. The physical distance can be for example the direct distance (as the crow flies) in this case. Alternatively, however, the physical distance can for example also be understood to mean the distance that needs to be covered in the applicable traffic network. A prescribed physical distance is for example 1 km, 500 m, 100 m or 50 m, which means that an authentication is effected only if the vehicle is closer than this distance to the automated shipment machine.

Further user actions by the user are in this way not required. Rather, the vehicle is automatically authenticated on the automated shipment machine when the user approaches the automated shipment machine in the vehicle, allowing a further time saving.

According to a further exemplary configuration of the aspects, the method furthermore comprises:
repeatedly automatically checking, by means of the vehicle, whether an automated shipment machine is in communication range and/or closer than a prescribed physical distance; and
setting up a communication connection to the automated shipment machine if the result of the checking is that the automated shipment machine is in communication range and/or closer than a prescribed physical distance.

As already explained, the checking of whether an automated shipment machine is in communication range and/or closer than a prescribed physical distance can be effected for example by comparing the ascertained and known physical positions of the vehicle and the automated shipment machine or preferably by measuring the round trip time or the round trip delay of a ping (preferably transmitted by the vehicle). The setting-up of the communication connection between the vehicle and the automated shipment machine can comprise or consist of in particular the authenticating that has already been described.

According to a further exemplary configuration of the aspects, the authenticating of the vehicle on the automated shipment machine effects or is followed by registration of the vehicle on the automated shipment machine and/or the authenticating of the user on the automated shipment machine effects or is followed by registration of the user on the automated shipment machine. The registering can thus be effected by the authenticating or can comprise separate steps therefrom. The registration allows the user to use for example particular services of the automated shipment machine, in particular services of the automated shipment machine that are intended specifically for delivery agents (and not for customers).

Since the user authenticated himself on the vehicle at the beginning, it is possible, as already explained, for a registration of the vehicle on the automated shipment machine to be also implicitly regarded as a registration of the user. However, it is possible for this (implicit) registration of the user to have to be followed by yet another (explicit) authentication by the user on the automated shipment machine.

According to a further exemplary configuration of the aspects, the repeated automatic checking, by means of the vehicle, of whether an automated shipment machine is in communication range and/or closer than a prescribed physical distance is effected even if an authentication of the vehicle on an automated shipment machine exists. In this way, it is possible to ascertain, in particular quickly and without further actions from the user, that the vehicle has moved to another (now closer) automated shipment machine (for example because the ping time is now the shortest), and it is possible for an applicable authentication of the vehicle on the now closest automated shipment machine to be effected.

According to a further exemplary configuration of the aspects, the authentication of the vehicle on the automated shipment machine is maintained for as long as the vehicle is in communication range for communication with the automated shipment machine and/or a communication connection between the automated shipment machine and the vehicle exists and/or no other authentication on the automated shipment machine is effected. Accordingly, the authentication of the vehicle on the automated shipment machine can be cancelled when the vehicle is outside the communication range for communication with the automated shipment machine and/or a communication connection between the automated shipment machine and the vehicle is interrupted and/or another authentication on the automated shipment machine is effected. Another authentication can be for example an authentication by another user (delivery agent) or by a customer. This furthermore contributes to making the process of loading and/or unloading an automated shipment machine or the preparation of same as time saving and secure as possible for the user.

According to a further exemplary configuration of the aspects, if multiple automated shipment machines are in communication range of the vehicle, an authenticating of the vehicle is effected preferably on that automated shipment machine that is situated physically closest. Typically, loading and/or unloading of that automated shipment machine that is physically closest to the vehicle is desirable. As a result of the authentication being effected on the applicable automated shipment machine, the user can continue to save time, since in this way an authentication of the vehicle is typically effected on the desired automated shipment machine.

According to a further exemplary configuration of the aspects, the method furthermore comprises:
detecting, on the automated shipment machine, a presence of the user on the automated shipment machine for performing a loading and/or unloading activity; and
activating a delivery agent mode of operation of the automated shipment machine.

The user (delivery agent) can normally access different services or functions of the automated shipment machine than a customer. In order to prevent for example a customer who is currently present at the automated shipment machine from gaining access thereto for services or functions that are not intended for him because the vehicle of the user (delivery agent) is approaching and close by, detection is performed to determine whether the user is actually present. Only then is a delivery agent mode of operation activated. The delivery agent mode of operation comprises, as explained, for example further services or functions that are not intended for the customer and that a customer normally cannot access. The delivery agent mode of operation is distinguished for example by this very access to the services or functions being possible. By way of example, the delivery agent mode of operation also comprises a different graphical user interface (if the automated shipment machine has an applicable graphical user interface).

According to a further exemplary configuration of the aspects, the detecting of the presence of the user is effected by means of a specific interaction of the user with a user interface of the automated shipment machine. The user interface can be an input device, such as a switch, or else a combined input/output device, for example a touchscreen. In this case, the input device can advantageously also be the input device that is used by the customers. The specific interaction in this case is preferably a nonobvious action. By way of example, the user interface itself is concealed or not easy to see. If the user interface is for example the touch screen that is also used by the customers, the action can involve for example operating a graphical user element that needs to be operated in nonobvious fashion.

According to a further exemplary configuration of the aspects, the authenticating of the user on the automated shipment machine is effected in the delivery agent mode of operation. By way of example, the authenticating of the user on the automated shipment machine can be effected exclusively in the delivery agent mode of operation. The user must for example initially activate the delivery agent mode of operation, for example by means of a specific interaction described above, before the user can be authenticated on the automated shipment machine. By way of example, only after the delivery agent mode of operation is activated is the user provided with access to a user element by means of which the user can enter applicable authentication information, for example a PIN.

According to a further exemplary configuration of the aspects, a fresh authenticating of the user and/or of the vehicle on the automated shipment machine and/or registering of the user and/or of the vehicle on the automated shipment machine is not necessary so long as the communication between the vehicle and the automated shipment machine is not interrupted or not interrupted for longer than a prescribed period. The prescribed period is in the region of seconds or minutes, for example. This can prevent for example brief connection disturbances from leading to authentications that need to be performed fresh and hence to a loss of time for the user.

According to a further exemplary configuration of the aspects, the method furthermore comprises:
detecting, on the automated shipment machine, shipment information from shipments for loading or loaded into or from the automated shipment machine; and/or
loading shipments into the automated shipment machine; and/or
loading shipments from the automated shipment machine.

The shipment information is for example information associated with the respective shipment (for loading into or from the automated shipment machine). By way of example, the shipment information comprises a reference number, a shipment number, sender information and/or recipient information. By way of example, the shipment information is (optically) put onto the respective shipment, for example by means of a human- or machine-readable print (for example by means of a line or barcode). Alternatively or additionally, the shipment information can also be read from the shipments electronically, for example by means of a local radio connection, for example by means of RFID (for example NFC) technique.

To load shipments into or from the automated shipment machine, a storage unit of the automated shipment machine is opened, for example. Subsequently, the user can place the shipment into the storage unit or take it from the storage unit. Subsequently, the storage unit is closed again.

Alternatively, in particular if an autonomous vehicle is involved, the loading and/or unloading, that is to say the loading of shipments into the automated shipment machine and/or the loading of shipments from the automated shipment machine, can also be effected in automated fashion, that is to say by the vehicle and/or the automated shipment machine. This can be effected for example by means of a loading device, for example comprising a gripper arm and/or a conveyor belt.

According to a further exemplary configuration of the aspects, the user is a delivery agent and the vehicle is a delivery vehicle. As already explained, the method described is advantageous in particular for a delivery agent with a delivery agent's vehicle, since the delivery agent can use the method to perform loading and/or unloading of the automated shipment machine in a secure and nevertheless time-saving manner.

According to a further exemplary configuration of the aspects, the automated shipment machine is a parcel station, an automated parcel machine and/or a parcel box. As already explained, a parcel station is an (at least partially automated) collection point and/or delivery point for parcel shipments, such as for example an automated parcel machine or a parcel box.

The exemplary configurations of the present invention that are described in this description are also intended to be understood as disclosed in all combinations with one another. In particular, the disclosure of a method step is also intended to disclose corresponding means for performing the applicable method step. Likewise, a means for performing a method step is also intended to disclose the applicable method step.

Further advantageous exemplary configurations of the invention can be found in the detailed description that follows for a few exemplary embodiments of the present invention, in particular in conjunction with the figures. The figures are intended to be used only for the purposes of clarification, however, but not for determining the scope of protection of the invention. The figures are not to scale and are merely intended to reflect the general concept of the present invention by way of example. In particular, features that the figures contain are by no means intended to be deemed a necessary part of the present invention.

DETAILED DESCRIPTION OF A FEW
EXEMPLARY EMBODIMENTS OF THE
INVENTION

Figure 1:
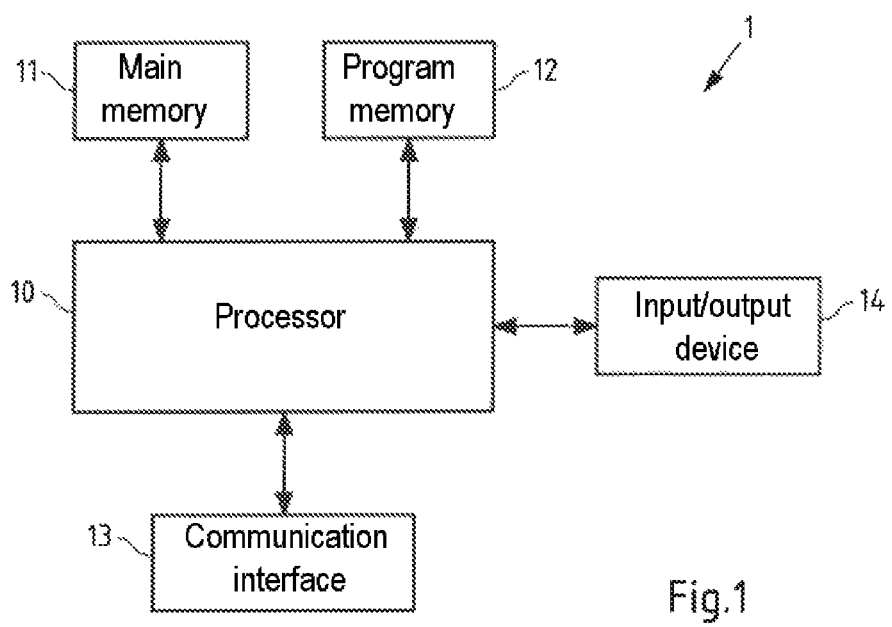
FIG. 1 shows a block diagram of an example embodiment of an apparatus, as an example of apparatuses according to the invention.

FIG. 1 first of all shows a block diagram of an exemplary embodiment of an apparatus 1 according to the invention that can perform an exemplary method according to the invention. The apparatus shown can be in particular a module or part of a vehicle or of an automated shipment machine, such as for example vehicle 2 or automated shipment machine 3 from FIG. 2. By way of example, the apparatus 1 is permanently integrated in a vehicle or an automated shipment machine.

Processor 10 of the apparatus 1 is in particular in the form of a microprocessor, microcontrol unit, microcontroller, digital signal processor (DSP), application-specific integrated circuit (ASIC) or field programmable gate array (FPGA).

Processor 10 executes program instructions stored in program memory 12, and stores for example interim results or the like in main memory 11. For example, program memory 120 is a non-volatile memory such as a flash memory, a magnetic memory, an EEPROM (electrically erasable programmable read only memory) memory and/or an optical memory. Main memory 11 is for example a volatile or non-volatile memory, in particular a random access memory (RAM) such as a static RAM (SRAM) memory, a dynamic RAM (DRAM) memory, a ferroelectric RAM (FeRAM) memory and/or a magnetic RAM (MRAM) memory.

Program memory 12 is preferably a local data carrier permanently connected to the apparatus 1. Data carriers permanently connected to the apparatus 1 are for example hard disks installed in the apparatus 1. Alternatively, the data carrier can for example also be a data carrier that is detachably connectable to the apparatus 1, such as a memory stick, a removable data carrier, a portable hard disk, a CD, a DVD and/or a floppy disk.

Program memory 12 contains for example the operating system of the apparatus 1, said operating system being at least partly loaded into main memory 11 when the apparatus 1 starts and being executed by the processor 10. In particular, when apparatus 1 starts, at least part of the core of the operating system is loaded into the main memory 11 and executed by processor 10. The operating system of apparatus 1 is for example a Windows, UNIX, Linux, Android, Apple iOS and/or MAC operating system.

The operating system allows in particular the use of the apparatus 1 for data processing. It manages for example resources such as main memory 11 and program memory 12, network interface 13, input and output device 14, makes basic functions available to other programs by means of programming interfaces, inter alia, and controls the execution of programs.

The processor 10 controls the communication interface 13, which can be a network interface, for example, and can be in the form of a network card, network module and/or modem. The communication interface 13 is in particular configured to set up a connection from the apparatus 1 to other apparatuses, in particular via a (wireless) communication system, for example a network, and to communicate with said other apparatuses. The communication interface 13 can for example receive data (via the communication system) and forward them to processor 10 and/or can receive and send (via the communication system) data from processor 10. Examples of a communication system are a local area network (LAN), a wide area network (WAN), a wireless network (for example according to the IEEE 802.11 standard, the Bluetooth (LE) standard and/or the NFC standard), a wired network, a mobile radio network, a telephone network and/or the Internet.

Communication interface 13 (for example as communication interface of the vehicle 2 or of the automated shipment machine 3, cf. FIG. 2) can in particular be used to provide and/or receive authentication information, as described.

In addition, processor 10 can control at least one input/output device 14. Input/output device 14 is for example a keyboard, a mouse, a display unit, a microphone, a touch sensitive display unit (touch screen), a loudspeaker, a reader, a drive and/or a camera. Input/output device 14 can for example accept inputs from a user and forward them to processor 10 and/or can receive and output information for the user from processor 10.

Input/output device 13 (for example as input/output device of the vehicle 2 or of the automated shipment machine 3, cf. FIG. 2) can also in particular be used to provide and/or receive authentication information, as described.

Figure 2A:
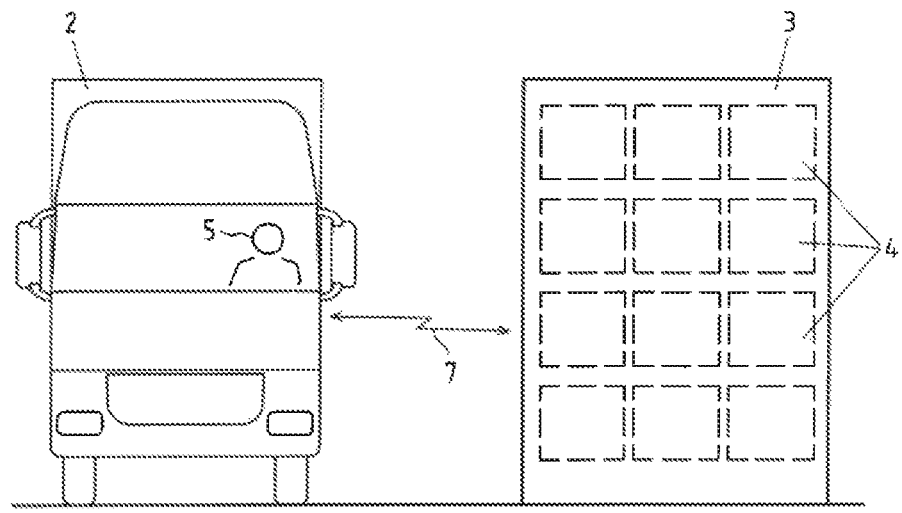
FIGS. 2a-c show an example embodiment of a system according to the invention comprising a vehicle and an automated shipment machine.
Figure 2B:
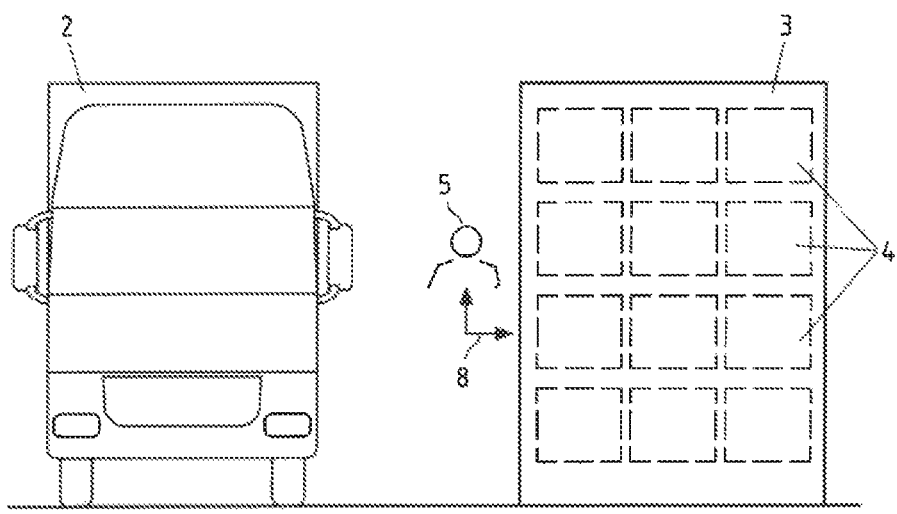
Figure 2C:
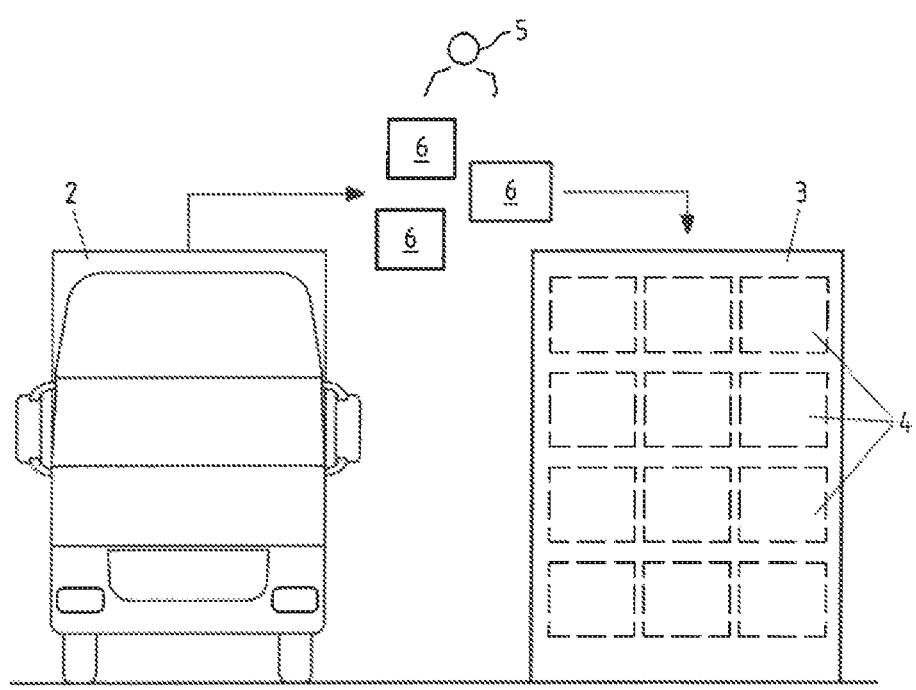

FIG. 2a-2c now show an example embodiment of a system according to the invention comprising a vehicle 2 and an automated shipment machine 3. A user, in this case a delivery agent 5, who also drives the vehicle 2, is likewise depicted.

The vehicle 2 is a delivery vehicle that can transport a multiplicity of shipments. The delivery agent's vehicle 2 comprises in particular at least one communication interface or an input device in order to receive authentication information from the delivery agent 5. The vehicle likewise has a communication interface in order to send authentication information to the automated shipment machine 3.

The automated shipment machine 3 is in the form of a packing station in this case. The automated shipment machine comprises a multiplicity of storage units in the form of lockers 4 in which respective shipments can be deposited. The automated shipment machine 3 has at least one communication interface in order to receive authentication information from the vehicle 2. Furthermore, the automated shipment machine 3 has an input/output device by means of which both customers and a delivery agent 5 can interact with the automated shipment machine. In this case, the automated shipment machine is designed, by means of the input/output device, in particular to detect the presence of the delivery agent 5 and to receive authentication information of the delivery agent 5.

Figure 3:
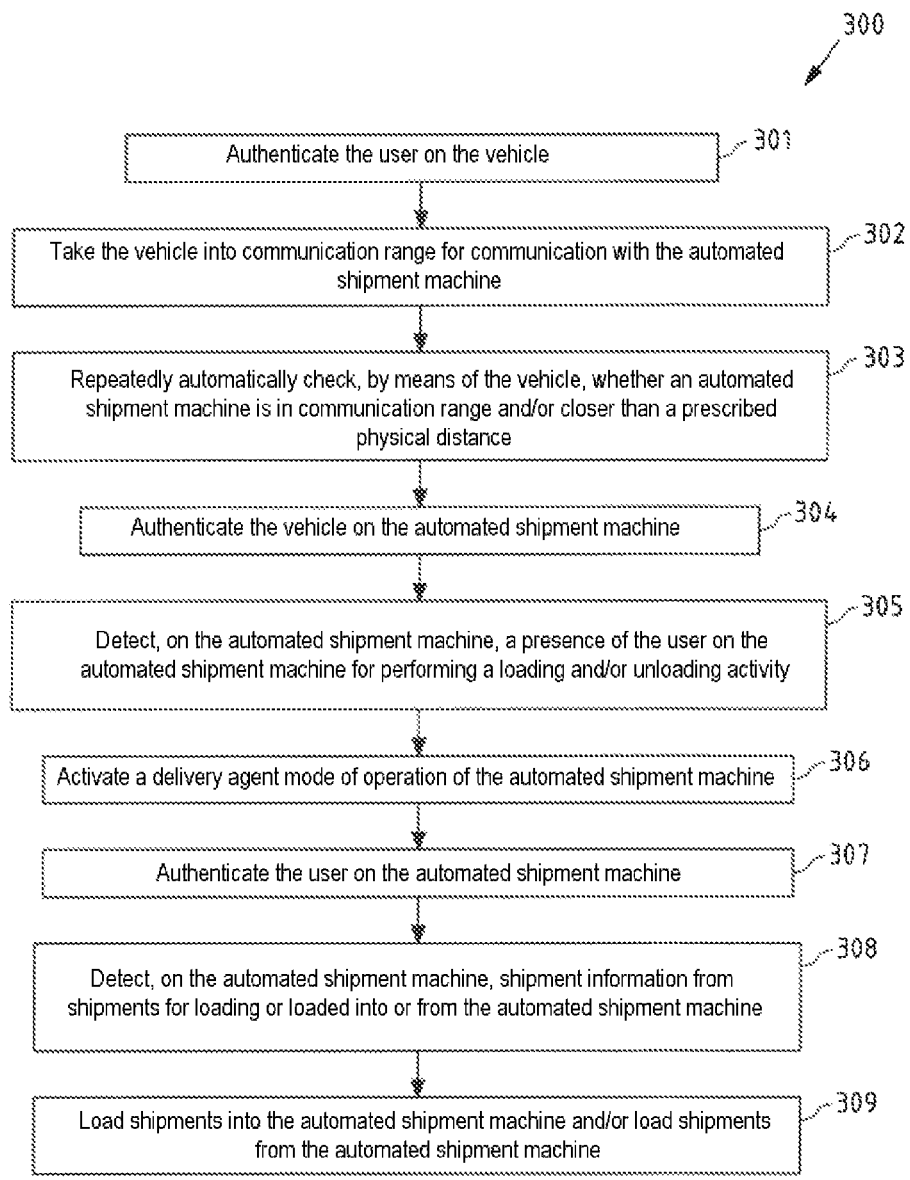
FIG. 3 shows a flowchart for an example embodiment of a method according to the invention.

The method for loading the automated shipment machine 3 with parcels 6 (see FIG. 2c) that is depicted in FIG. 2a-c is now described in more detail in connection with FIG. 3. FIG. 3 in this case shows a flowchart 300 for an example embodiment of a method according to the invention.

In a first step, the delivery agent 5 authenticates himself on the vehicle, action 301. As such, the delivery agent 5 authenticates himself on the delivery agent's vehicle 2 once, for example at the beginning of his delivery round, to determine his identity. This can be effected for example using a personalized ignition key or by virtue of his employee ID being read in on a permanently installed card reader.

Subsequently, the delivery agent 5 begins his delivery round and takes the vehicle 2 to the automated shipment machine 3, and in so doing finally comes into communication range of the automated shipment machine 3, action 302, as also depicted in FIG. 2a.

In this case, repeated, automatic checking (by means of a ping method) is effected by the vehicle 2 to determine whether an automated shipment machine is in communication range and/or closer than a prescribed physical distance (for example 100 m), action 303.

When the vehicle comes close to the automated shipment machine 3, a connection is set up, for example by means of Bluetooth, (semiactive) RFID or WLAN, as indicated by arrow 7 in FIG. 2a. The vehicle 2 is authenticated on the automated shipment machine 3 by means of a secure connection, action 304. Via the connection 7, the delivery agent 5 associated with the vehicle 2 remains registered on the automated shipment machine 3, provided that the vehicle 2 has successfully authenticated itself to the automated shipment machine 3 by means of a sufficiently secure authentication method (e.g. an encrypted transmission using the challenge-response method, with the nonce likewise being transmitted in encrypted fashion), for as long as there is a (substantially) uninterrupted connection and no other user authenticates himself or registers on the automated shipment machine.

Certainly when the connection between vehicle and automated shipment machine is (permanently) interrupted, a fresh check is performed to determine whether an automated shipment machine is in communication range or is closer than the prescribed physical distance (action 303).

Should multiple automated shipment machines be in communication range or closer than the prescribed physical distance at the same time, a connection is always set up to the closest automated shipment machine (for example determinable by means of the shortest ping time).

The ping method can in this case still be performed even in the event of existing authentication or registration on an automated shipment machine.

So long as the vehicle is authenticated on the automated shipment machine, but the delivery agent 5 has not yet confirmed his loading or unloading activity by means of an active action that is not readily discernible (that is to say is concealed) for normal customers (for example a particular action on the input/output device), the automated shipment machine 3 or the display of the automated shipment machine 3 does not change to the delivery agent mode of operation, but rather the customer mode of operation continues (normal mode screen). As such, it is possible to ensure that the registrations of customers on the automated shipment machine are handled with priority and no one can abuse the delivery agent mode of operation.

If a presence of the delivery agent 5 at the automated shipment machine 3 for performing a loading and/or unloading activity has now been detected (by means of the specific action or interaction of the delivery agent 5) on the automated shipment machine 3, action 305, a delivery action mode of operation of the automated shipment machine is activated, action 306.

An authentication method independent of the vehicle can now be used to authenticate the delivery agent 5 on the automated shipment machine 3, action 307, as also depicted in FIG. 2b by arrow 8. This can be effected by means of entry of a PIN of the scanning of a bar code of the employee ID, for example, to cite just two examples.

If the connection between the vehicle 2 and the automated shipment machine 3 has been broken in the meantime, no further authentication is necessary so long as the break in the connection does not last for longer than a stipulated period.

After his presence for the loading or unloading activity is also confirmed by the actions 305, 307, the delivery agent 5 can now immediately begin, without further authentication, to have shipment information captured by the automated shipment machine, action 308, when there is a connection between vehicle 2 and automated shipment machine 3.

The user 5, or alternatively also the vehicle 2 or the automated shipment machine 3 in automated fashion, can load shipments 6 into the automated shipment machine (depicted by way of example in FIG. 2c) and load shipments from the automated shipment machine 3, action 309.

At the end of the delivery round, the delivery agent 5 deregisters from the vehicle 2, which also breaks the effected authentication or association between delivery agent 5 and vehicle 2. Should the delivery agent forget to do this, this connection can be broken automatically, for example after a predetermined period of inactivity (for example on the vehicle), for example after several hours (for example after 6 hours).

The example embodiments of the present invention that are described in this specification and the optional features and characteristics mentioned in this regard in each case are also intended to be understood as disclosed in all combinations with one another. In particular, the description of a feature that an example embodiment comprises is—unless explicitly explained to the contrary—also not intended to be understood, in the present case, to mean that the feature is indispensable or essential for the function of the example embodiment. The sequence of the method steps outlined in this specification in the individual flowcharts is not imperative, and alternative sequences of the method steps are conceivable. The method steps can be implemented in different ways, and implementation in software (by virtue of program instructions), hardware or a combination of the two is thus conceivable for implementing the method steps. Terms used in the patent claims such as "comprise", "have", "include", "contain" and the like do not exclude further elements or steps. The wording "at least partially" covers both the "partially" case and the "completely" case. The wording "and/or" is intended to be understood to mean that both the alternative and the combination are intended to be disclosed, that is to say that "A and/or B" means "(A) or (B) or (A and B)". The use of the indefinite article does not exclude a plurality. A single apparatus can perform the functions of multiple units or apparatuses cited in the patent claims. Reference signs specified in the patent claims are not intended to be regarded as limitations for the means and steps employed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for loading and/or unloading an automated shipment machine with shipments by means of a user with a vehicle or for preparing same, wherein the automated shipment machine is a stationary automated shipment machine with a plurality of storage units for receiving respective shipments, wherein the user is a delivery agent, and wherein the vehicle is a delivery vehicle, the method comprising:
   authenticating the user on the vehicle, wherein the authentication of the user on the vehicle involves receiving authentication information of the user on the vehicle;
   taking the vehicle into communication range for communication with the automated shipment machine;
   authenticating the vehicle on the automated shipment machine, wherein the authentication of the vehicle on the automated shipment machine involves providing authentication information from the vehicle to the automated shipment machine;
   wherein the authentication information of the vehicle received on the shipment machine is generated based at least in part on the authentication information of the user received on the vehicle such that by authenticating the vehicle on the automated shipment machine also the user is implicitly authenticated on the automated shipment machine on account of the fact that the user has initially authenticated himself on the vehicle;
   wherein the authentication of the vehicle on the automated shipment machine is effected automatically when the vehicle is in communication range and/or closer than a prescribed physical distance to the automated shipment machine; and
   wherein the method further comprises:
      repeatedly automatically checking, by means of the vehicle, whether an automated shipment machine is in communication range and/or closer than a prescribed physical distance, wherein the repeated automatic checking, by means of the vehicle, of whether an automated shipment machine is in communication range and/or closer than a prescribed physical distance is effected even if an authentication of the vehicle on an automated shipment machine exists; and
      setting up a communication connection to the automated shipment machine if the result of the checking is that the automated shipment machine is in communication range and/or closer than a prescribed physical distance.

2. The method according to claim 1, wherein the authenticating of the user on the vehicle, the authenticating of the vehicle on the automated shipment machine and/or the authenticating of the user on the automated shipment machine comprises a challenge-response method.

3. The method according to claim 1, wherein the authenticating of the vehicle on the automated shipment machine effects or is followed by registration of the vehicle on the automated shipment machine and/or the authenticating of the user on the automated shipment machine effects or is followed by registration of the user on the automated shipment machine.

4. The method according to claim 1, wherein the authentication of the vehicle on the automated shipment machine is maintained for as long as the vehicle is in communication range for communication with the automated shipment machine and/or a communication connection between the automated shipment machine and the vehicle exists and/or no other authentication on the automated shipment machine is effected.

5. The method according to claim 1, wherein if multiple automated shipment machines are in communication range of the vehicle, an authenticating of the vehicle is effected preferably on that automated shipment machine that is situated physically closest.

6. The method according to claim 1, wherein the method furthermore comprises:
   detecting, on the automated shipment machine, a presence of the user on the automated shipment machine for performing a loading and/or unloading activity; and
   activating a delivery agent mode of operation of the automated shipment machine.

7. The method according to claim 6, wherein the detecting of the presence of the user is effected by means of a specific interaction of the user with a user interface of the automated shipment machine.

8. The method according to claim 6, wherein the authenticating of the user on the automated shipment machine is effected in the delivery agent mode of operation.

9. The method according to claim 1, wherein a fresh authenticating of the user and/or of the vehicle on the automated shipment machine and/or registering of the user and/or of the vehicle on the automated shipment machine is not necessary so long as the communication between the vehicle and the automated shipment machine is not interrupted or not interrupted for longer than a prescribed period.

10. The method according to claim 1, wherein the method furthermore comprises:
    detecting, on the automated shipment machine, shipment information from shipments for loading or loaded into or from the automated shipment machine; and/or
    loading shipments into the automated shipment machine; and/or
    loading shipments from the automated shipment machine.

11. The method according to claim 1, wherein the user is a delivery agent and the vehicle is a delivery vehicle.

12. The method according to claim 1, wherein the automated shipment machine is a parcel station, an automated parcel machine and/or a parcel box.

13. An apparatus configured for performing a method for loading and/or unloading an automated shipment machine with shipments by means of a user with a vehicle or for preparing same, wherein the automated shipment machine is a stationary automated shipment machine with a plurality of storage units for receiving respective shipments, wherein the user is a delivery agent, and wherein the vehicle is a delivery vehicle, the method comprising:
   authenticating the user on the vehicle, wherein the authentication of the user on the vehicle involves receiving authentication information of the user on the vehicle;
   taking the vehicle into communication range for communication with the automated shipment machine;
   authenticating the vehicle on the automated shipment machine, wherein the authentication of the vehicle on the automated shipment machine involves providing authentication information from the vehicle to the automated shipment machine;
   wherein the authentication information of the vehicle received on the shipment machine is generated based at least in part on the authentication information of the user received on the vehicle such that by authenticating the vehicle on the automated shipment machine also the user is implicitly authenticated on the automated shipment machine on account of the fact that the user has initially authenticated himself on the vehicle;
   wherein the authentication of the vehicle on the automated shipment machine is effected automatically when the vehicle is in communication range and/or closer than a prescribed physical distance to the automated shipment machine; and
   wherein the method further comprises:
      repeatedly automatically checking, by means of the vehicle, whether an automated shipment machine is in communication range and/or closer than a prescribed physical distance, wherein the repeated automatic checking, by means of the vehicle, of whether an automated shipment machine is in communication range and/or closer than a prescribed physical distance is effected even if an authentication of the vehicle on an automated shipment machine exists; and
      setting up a communication connection to the automated shipment machine if the result of the checking is that the automated shipment machine is in communication range and/or closer than a prescribed physical distance.

14. A system comprising:
an automated shipment machine and
a vehicle,
wherein the automated shipment machine is a stationary automated shipment machine with a plurality of storage units for receiving respective shipments, wherein the vehicle is a delivery vehicle, and wherein the system is configured for performing or comprises means for performing a method for loading and/or unloading the automated shipment machine with shipments by means of a user with the vehicle or for preparing same, wherein the user is a delivery agent, the method comprising:
   authenticating the user on the vehicle, wherein the authentication of the user on the vehicle involves receiving authentication information of the user on the vehicle;
   taking the vehicle into communication range for communication with the automated shipment machine;
   authenticating the vehicle on the automated shipment machine, wherein the authentication of the vehicle on the automated shipment machine involves providing authentication information from the vehicle to the automated shipment machine;
wherein the authentication information of the vehicle received on the shipment machine is generated based at least in part on the authentication information of the user received on the vehicle such that by authenticating the vehicle on the automated shipment machine also the user is implicitly authenticated on the automated shipment machine on account of the fact that the user has initially authenticated himself on the vehicle;
wherein the authentication of the vehicle on the automated shipment machine is effected automatically when the vehicle is in communication range and/or closer than a prescribed physical distance to the automated shipment machine; and wherein the method further comprises:

repeatedly automatically checking, by means of the vehicle, whether an automated shipment machine is in communication range and/or closer than a prescribed physical distance, wherein the repeated automatic checking, by means of the vehicle, of whether an automated shipment machine is in communication range and/or closer than a prescribed physical distance is effected even if an authentication of the vehicle on an automated shipment machine exists; and setting up a communication connection to the automated shipment machine if the result of the checking is that the automated shipment machine is in communication range and/or closer than a prescribed physical distance.

15. A non-transitory machine readable medium having stored thereon a computer program product comprising program instructions in order to perform when the program is executed on a processor, a method for loading and/or unloading an automated shipment machine with shipments by means of a user with a vehicle or for preparing same, wherein the automated shipment machine is a stationary automated shipment machine with a plurality of storage units for receiving respective shipments, wherein the user is a delivery agent, and wherein the vehicle is a delivery vehicle, the method comprising:

authenticating the user on the vehicle, wherein the authentication of the user on the vehicle involves receiving authentication information of the user on the vehicle;

taking the vehicle into communication range for communication with the automated shipment machine;

authenticating the vehicle on the automated shipment machine, wherein the authentication of the vehicle on the automated shipment machine involves providing authentication information from the vehicle to the automated shipment machine;

wherein the authentication information of the vehicle received on the shipment machine is generated based at least in part on the authentication information of the user received on the vehicle such that by authenticating the vehicle on the automated shipment machine also the user is implicitly authenticated on the automated shipment machine on account of the fact that the user has initially authenticated himself on the vehicle;

wherein the authentication of the vehicle on the automated shipment machine is effected automatically when the vehicle is in communication range and/or closer than a prescribed physical distance to the automated shipment machine; and wherein the method further comprises:

repeatedly automatically checking, by means of the vehicle, whether an automated shipment machine is in communication range and/or closer than a prescribed physical distance, wherein the repeated automatic checking, by means of the vehicle, of whether an automated shipment machine is in communication range and/or closer than a prescribed physical distance is effected even if an authentication of the vehicle on an automated shipment machine exists; and setting up a communication connection to the automated shipment machine if the result of the checking is that the automated shipment machine is in communication range and/or closer than a prescribed physical distance.

\* \* \* \* \*